(12) United States Patent
Kerner (10) Patent No.: US 9,067,368 B2
(45) Date of Patent: Jun. 30, 2015

(54) TIRE REPAIR KIT

(71) Applicant: U.S. Thermoelectric Consortium, Chico, CA (US)

(72) Inventor: James M. Kerner, Chico, CA (US)

(73) Assignee: UNITED STATES THERMOELECTRIC CONSORTIUM (USTC), Chico, CA (US)

( * ) Notice: Subject to any disclaimer, the term of this patent is extended or adjusted under 35 U.S.C. 154(b) by 0 days.

(21) Appl. No.: 13/999,974

(22) Filed: Apr. 11, 2014

(65) Prior Publication Data

US 2014/0298956 A1     Oct. 9, 2014

Related U.S. Application Data

(63) Continuation-in-part of application No. 13/986,677, filed on May 23, 2013, now Pat. No. 8,707,829.

(60) Provisional application No. 61/650,478, filed on May 23, 2012.

(51) Int. Cl.
*B25F 1/00* (2006.01)
*B29C 73/08* (2006.01)
*B29C 73/06* (2006.01)
*B29L 30/00* (2006.01)
*B29C 73/26* (2006.01)

(52) U.S. Cl.
CPC .............. *B29C 73/08* (2013.01); *B29L 2030/00* (2013.01); *B29C 73/06* (2013.01); *B29C 73/26* (2013.01)

(58) Field of Classification Search
CPC ........................... B29C 73/08; B29L 2030/00
USPC ................................................ 81/15.7; 7/100
See application file for complete search history.

(56) References Cited

U.S. PATENT DOCUMENTS 4,716,792 A     1/1988   Hector
8,707,829 B2 *  4/2014   Kerner ........................... 81/15.7

* cited by examiner

*Primary Examiner* — Lee D Wilson
*Assistant Examiner* — Danny Hong
(74) *Attorney, Agent, or Firm* — Jonathan E. Grant; Grant Patent Services (57) ABSTRACT

A tire repair kit is disclosed which includes a plurality of tubes containing repair plugs, a clearance tool for clearing debris in a tire, and stopper to prevent air loss during the repair. The kit also includes a handle for storing the tools and for attaching the tools to make the appropriate repairs to the tire.

19 Claims, 14 Drawing Sheets

TIRE REPAIR KIT

The following application is a continuation in part and claims U.S. patent application Ser. No. 13/986,677, filed May 23, 2013 which claims priority to U.S. Patent 61/650,478, filed May 23, 2012, herein incorporated by reference.

BACKGROUND OF THE DISCLOSURE

Today, more and more people drive longer distances, often riding motorcycles or bicycles to get to work and for recreation. Sometimes, however, these tires hit obstructions in the road, which lead to tire puncture wounds. While certain tire repair kits have allowed for temporary or even reasonably secure repairs to the tires, riders and passengers, in their zest to the repair the punctured tire do more harm by good by either damaging the tire repair tool or injuring themselves.

U.S. Pat. No. 4,716,792 (Hector) (herein incorporated by reference) discloses a tool to repair a tire puncture wherein a repair between the user's fingers and loaded into a tool tube with a brass point at the end of the plug sticking out. The user then finds the puncture site of the tire, removes the puncture object using pliers, and aligns the tube with the angle of the puncture, and pushes the repair plug through the hole in the tire tread plies. The tool is retracted from the tire, and the tail of the repair plug sticks out of the tire and the excess is cut off.

Off times, however, users inserted the tool in the tire incorrectly such that the tube was not pushed axially keeping the tool perpendicular to the surface of the puncture being repaired or they did not follow the correct angular path of puncture entry. Consequently, the misuse of the tool resulted in a side force parallel to the tire surface such that the tool tube was bent and disabled.

In other situations, after multiple uses, the steel tube gets abraded as it penetrates the steel belt of the tire when a repair is made. If the lead edge of the tube gets too rough or jagged, it becomes much more difficult to make a successful repair since the rough edge increases the force needed to penetrate the tire in the puncture path made by an object like a nail or screw that originally punctured and compromised the tire.

In other instances, users do not fully compress the cord of the plug by rolling it in their fingers, and in some cases the cord and the tip are held with two hands, one on the cord and one on the metal tip. Consequently, the plugs metal tip is twisted and it breaks off of the cord and a repair cannot be completed.

BRIEF DESCRIPTION OF THE DISCLOSURE

The present disclosure is a complete kit for that allows for a margin of error, so that the tire repair tool kit can be used easily and safely. The kit prevents or limits injuries, during the use of the kit, while allowing for a greater ease of use.

In one embodiment, the new repair kit comes with interchangeable components.

Another embodiment allows for easier repair of automobile, motorcycle and bicycle tires with minimum force.

In yet another embodiment, the system contains a flared metal tube, or flared tube with a shoulder, which secures to the main body and to which various components can be added.

In one embodiment, the kit comprises a hollow body or casing with interior cavities. These cavities can hold at least one metal tube pre-loaded with repair plugs. The interior cavities may further hold at least one clearing tool, or it may hold a variety of clearing tools of various sizes. In another embodiment, the device may hold an air stopper temporary or permanent repair plug tool.

In yet another embodiment, the clearing tool(s) may be a small drill like device with unique cutting flutes that allow for minor removal of material inside the site of the puncture, which is achieved with a fixed bit and a straight in an out motion.

In another embodiment, a temporary or permanent repair plug may be included in the kit that can be used to temporarily stop loss of air pressure immediately after the tire damaging puncture element such as a nail or screw has been removed.

In one embodiment of the disclosure, the kit is comprised of a case or hollow handle.

BRIEF DESCRIPTION OF THE DRAWINGS

The accompanying drawings, which are incorporated herein and form a part of the specification, illustrate one or more embodiments of the present disclosure and, together with the description, further serve to explain the principles of the disclosure and to enable a person skilled in the pertinent art to make and use the disclosure.

DETAILED DESCRIPTION OF THE DISCLOSURE

Referring to FIGS. 1-8, kit 1 is a kit comprising a case 2. The case 2 ranges in size from about 4" to about 8". The case 2 is comprised of wood, plastic (polyethylene), metal, or metal coated plastic. In one embodiment, the case is comprised of two hollow sections 3 and 4 with a first section 3 slidably twisting into the second section 4. Each section is circular or tubularly shaped, and closed at one end. The second section 4 is threaded 5 and the first section 3 has threads 6, 7 on each side of its tubular body, such that the first section 4 which can be twisted together.

Other cases can include a regular cylindrical container with a cap. Any number of containers can be used.

Figure 1:
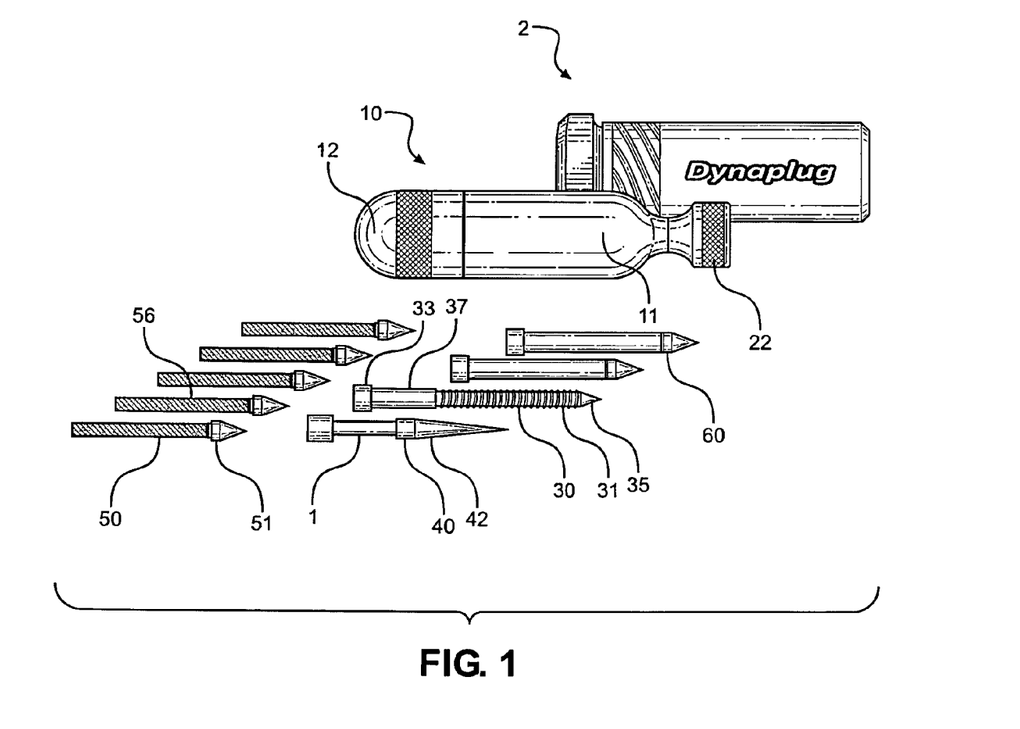
FIG. 1 is a frontal view of the contents of one embodiment of the kit.
Figure 2:
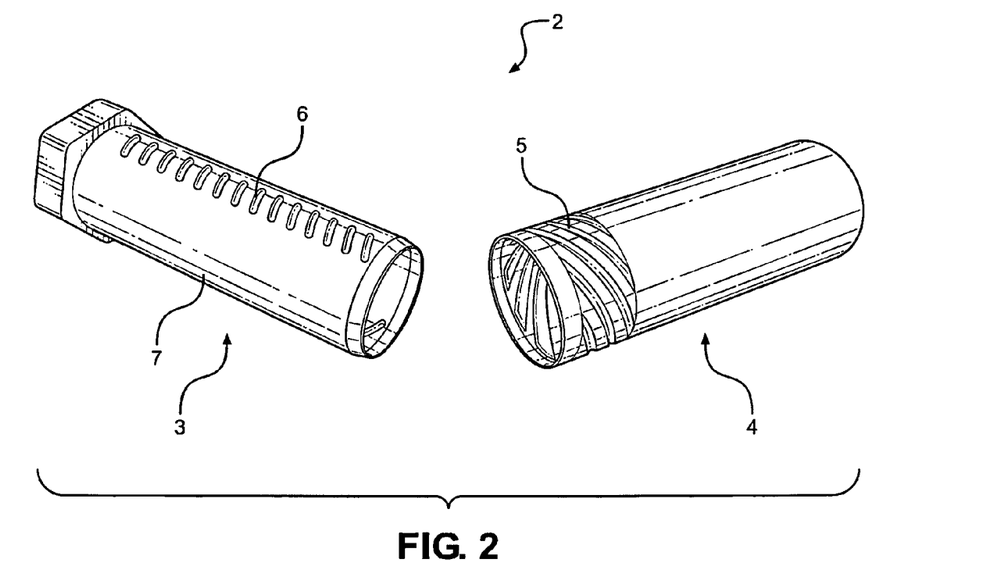
FIG. 2 is a perspective view of the two sections of the case.
Figure 3:
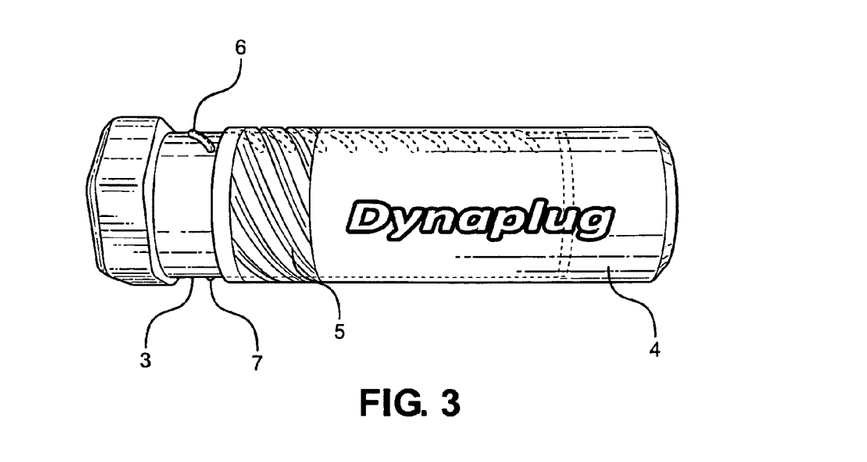
FIG. 3 is a frontal view of the case.
Figure 4:
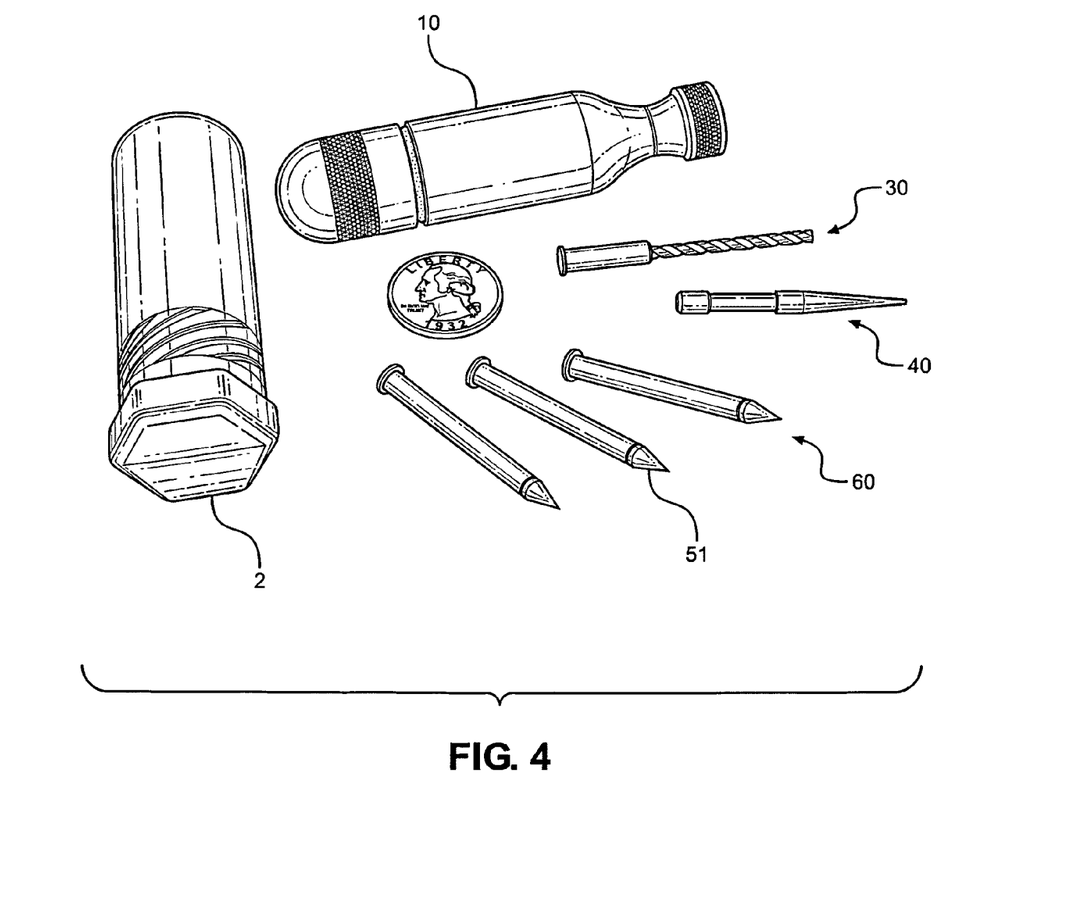
FIG. 4 is a perspective view of the size of one embodiment of the kit.
Figure 5:
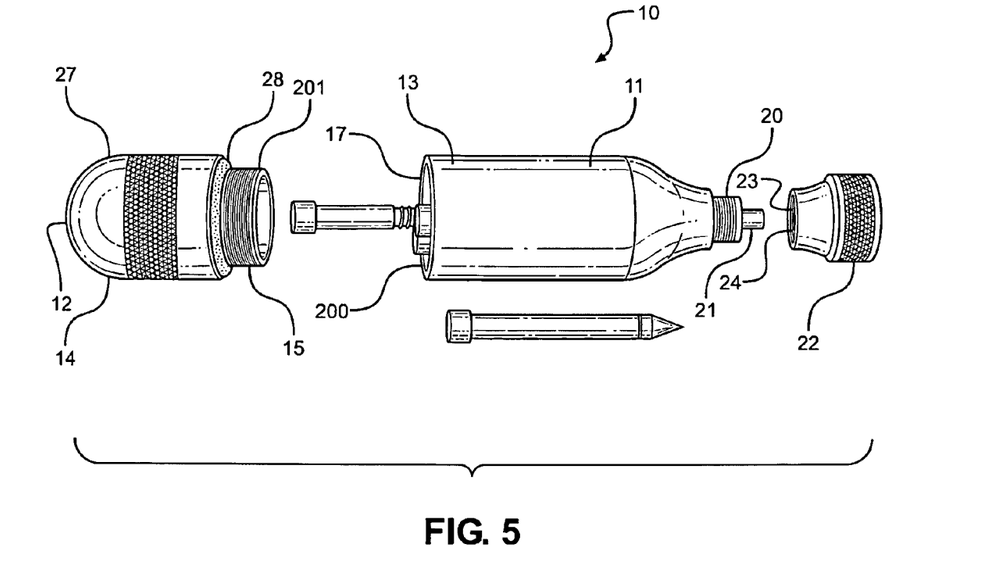
FIG. 5 is a frontal perspective view of the tool.
Figure 7:
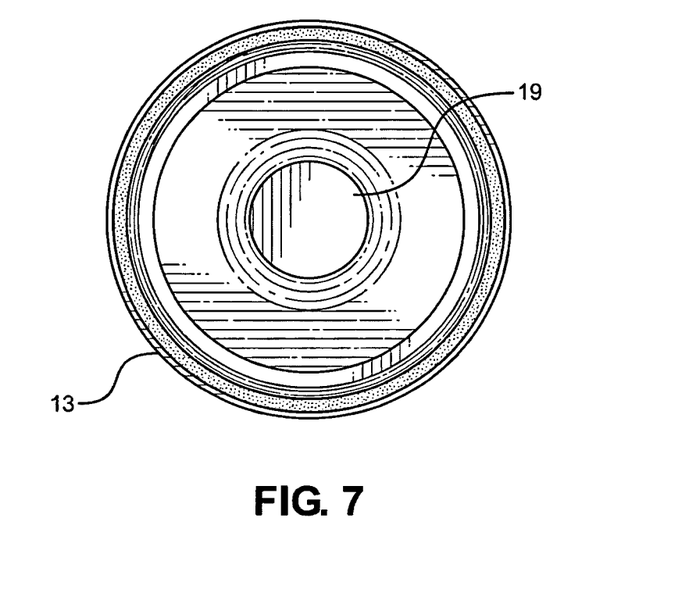
FIG. 7 is a frontal view of a distal end of cap to the first embodiment of the tool.
Figure 8:
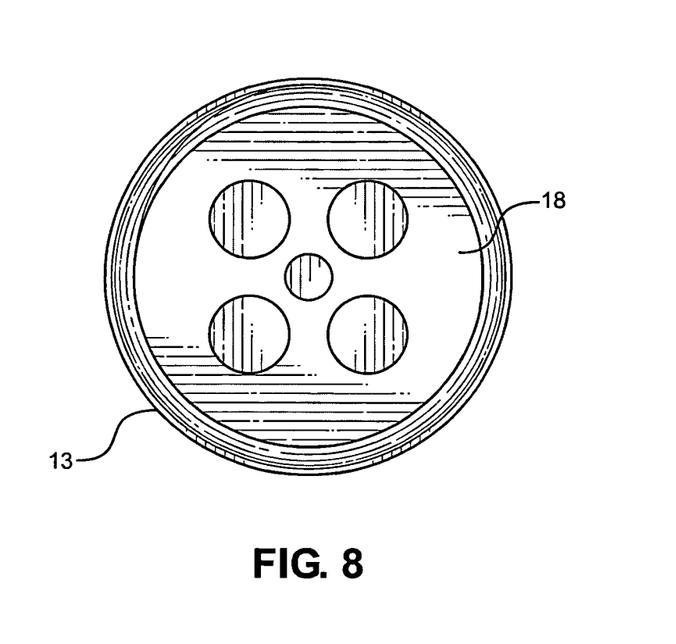
FIG. 8 is a frontal view of a proximal end of the hand grip of the first embodiment of the tool.

The tool 10 is an elongated handle having a top section 11 and a bottom section 12. Other metals could be used. The top section 11 of the tool 10 is the handle grip 13, and the bottom section 12 of the handle grip is a bottom cap 14, which can be connected to the handle grip by means of threads 15 on the cap 14 and complementary threads 16 inside the handle grip 13. The top section 11 and bottom section 12 can be secured together by a variety of methods, including by a bayonet lock or they could be screwed together by other interlocking configurations.

A rubber washer or "o" ring 28 can fit at the proximal ends of the threads 15 of the cap for waterproof seal. The elongated handle may be made out of plastic, metal coated plastic, wood, or rubber. In one embodiment, the tool is made out of metal, and the metal is aluminum or stainless steel.

The bottom cap 1 is tooled such that within the cap there is a seat 19 wherein the proximal end of one of the tools centered fits. The proximal end 27 of the cap may be flat or rounded as shown.

Figure 6:
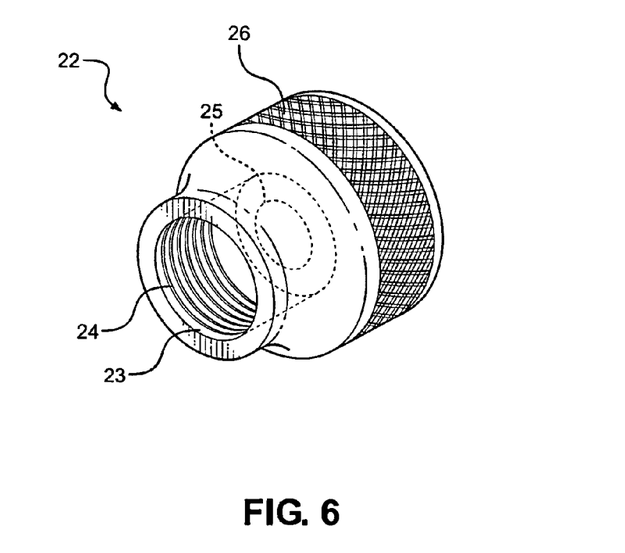
FIG. 6 is a perspective view of the nose piece.

At the distal end 18 of the handle grip 13 is a narrowed threaded projection 20 with a centered projection pin 21. A nose piece 22 having a centered lateral opening 23 therein and complementary threads 24 around said opening 23 is fitted over said narrow threaded projection 20. When an appropriate tool is inserted through the centered lateral opening 23, the nose piece 22 is screwed down over the narrowed threaded section 20. An inward rim 25 at the distal end 26 of the nose piece 22 locks down the inserted tool.

Inside of the handle grip 13 is a hollow space, wherein there are a plurality of pockets 18 through which various tools fit. In another embodiment, the handle grip is hollow and therein fits a support platform 19 having openings 20 through which the various puncture repair tools fit.

It should be noted that the proximal end of the top section is threaded 200 and the distal end of the bottom section is threaded 201 so that they can be screwed together.

Figure 9:
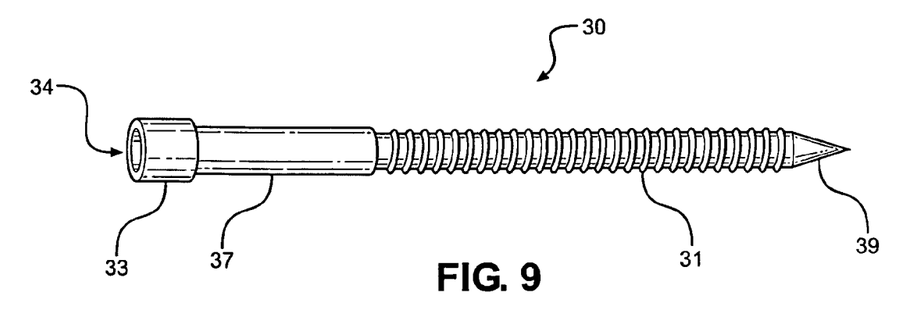
FIG. 9 is a side perspective view of a clearance tool accessory.

In one embodiment of the disclosure, one of the various puncture repair tools is a clearing tool accessory 30. The clearing tool accessory 30 which ranges in size from about one inch to four inches, is a small drill-like device, about the width of the diameter of the plug which is from about 1/16" to about 1/4". These diameters may vary. In one embodiment, the distal section 39 of the clearing tool accessory 30 has cutting flutes 31 that allow for minor removal of material inside the site of the puncture. These flutes 31 which run from just after the small conical tip 35 at the distal end 36 up to the jacket 37 of the tool are basically a plurality of grooved cuts that are perpendicular to the length of the metal projectile that is the tool. This is achieved by inserting the fixed bit end of the device into the insertion tube and quickly motioning the bit into and out of the puncture hole. Alternatively, the clearing tool accessory can be used manually, without the need to insert it into to the tube. No rotation of the clearing tool accessory 30 is necessary. The proximal end 32 of the tool accessory 30 has a jacket 37 at the proximal end of the tool that provides support for the working section of the tool so that the tool does not snap in half or otherwise break while in use. A shoulder 33 is positioned at the bottom of and is integral with jacket 37. The jacket is broader than the working part of the tool and the shoulder is broader than the rest of the jacket. This shoulder 33, which has a hollow inside section 34 fits over the projection pin 21. The nose piece 22 is then fitted over the clearing tool 30, and tightened. The jacket is no more than about 1/3-1/4 the length of the cutting tool. The jacket surrounds the cutting tool, and the cutting tool or fits through the center of the jacket. In another embodiment, the cutting section of the tool is spiral.

The kit can hold one size or various different sizes of the clearing tube, and the size used will depend on the size of the puncture and the diameter of the plug needed to make the repair. The purpose is not to ream a hole larger, thus further weakening the tire of the puncture, but rather, to remove a minimal amount of tire material that is in the puncture path if the path is significantly smaller than the plug or embodiment inserted. Making this minimal clearance with the clearance tool makes the insertion force substantially less and thus it will be much easier to insure the plug to execute a permanent, or even temporary, repair.

Figure 10:
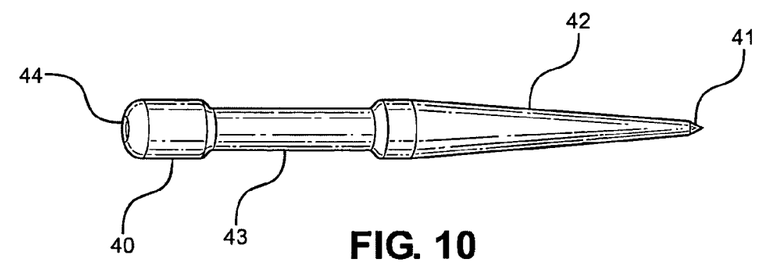
FIG. 10 is side perspective view of a temporary or permanent repair plug.

In another embodiment, a temporary or permanent repair plug 40 is included in the kit. The temporary or permanent repair plug 40 serves as a temporary stopper before the puncture has been cleaned by the clearing tool accessory, and prevents the loss of air as the next step in the use of the tool is prepared. In embodiment, the clearing tool has a sharp, pointed, pin type end 41 for easier insertion into the hole. At the distal end, from one quarter to about one half of the clearing plug 40 is an elongated conical shape 42. This tool is generally not mounted on the handle, as one has to insert the temporary or permanent repair plug into the tire hole promptly, after the hole has been cleaned out. This small tool is particularly helpful with smaller scooter or motorcycle tires where it is advantageous to lose the least amount of air so that a repair can be completed without having to refill the tire with lost air. The temporary or permanent repair plug 40 is beneficial for tire repairs of any type or size as it is always beneficial to minimize pressure loss. When repairing a semi-truck tire, after removing a 16d (16 penny nail, the tire may lose a few PSI of air pressure for every five seconds from when the nail or piercing element has been extracted. However, on a scooter tire such as a Vespa, perhaps 5 or 10 PSI or more may be lost in the same five seconds, and, and thus a smaller tire can go totally flat relatively rapidly when compared to a larger truck tires or bus tires. There is a narrow base 43 proximal to the conical plug section to allow for a person to easily grip the tool. A proximal end abutment 44 is positioned at the proximal end of the tool. Other embodiments have variations to the gripping section of the tool.

Figure 11:
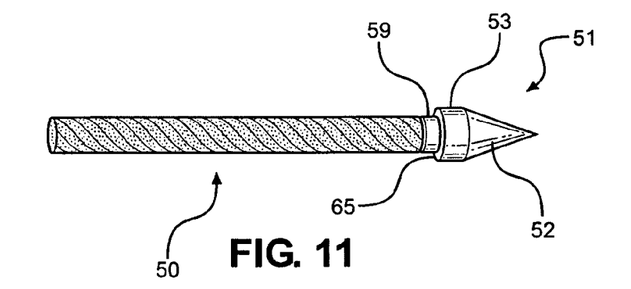
FIG. 11 is a side view of a repair plug.
Figure 12:
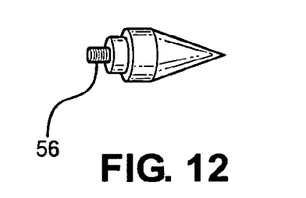
FIG. 12 is a perspective view of the metal conical tip of the repair plug.

The next step in the process of the tire repair is the insertion into the tire hole of a repair plug 50. The tire repair plug consists of a metal or hard plastic tip 51 which has a pointed conical section 52 and a circumferential shoulder 53 attached to the pointed conical section 52. Proximal to the shoulder is a tip collar 59 which has a smaller circumference than the shoulder 53. In one embodiment, the tip 51 is copper. In another embodiment, the tip 51 is bronze or even stainless steel. The tip can also be comprised of carbon fiber, or of other synthetic resins or alloys. It is important that the tip be strong enough to penetrate the steel belt in steel belted radial tires. The tip 51 can be smooth, or it can be threaded 54.

At the proximal end of the tip is a hollowed out opening 55, circumferentially placed within the tip. It is within this opening that an elongated rubberized cord or filler 56, or a rubber impregnated plug 56, is attached, normally by a strong glue or crimping device. In an alternative embodiment, the filler or cord by attached within the opening by means of a hook or loop, through which at least part of the cord or filler is fed. In another embodiment, the filler 56 is attached to the tip 51 where the circumference of the proximal end of the tip has an inward bend 57, thereby securing the filler or cord to the tip 51. The rubber impregnated plug 56 may be from about an inch to three inches or more long, and may be of varying widths, the usage of which being dependent on the size of the hole in the tire. Each kit may have a few repair plugs of either the same size or of varying sizes.

Alternatively, in the even the puncture is larger puncture like that made by a 16d (16 penny) nail, for emergency repairs, the user inserts plug one and then folds the tail of the plug one over the tire surface while inserting plug two or three after which the puncture is sealed.

Figure 13:
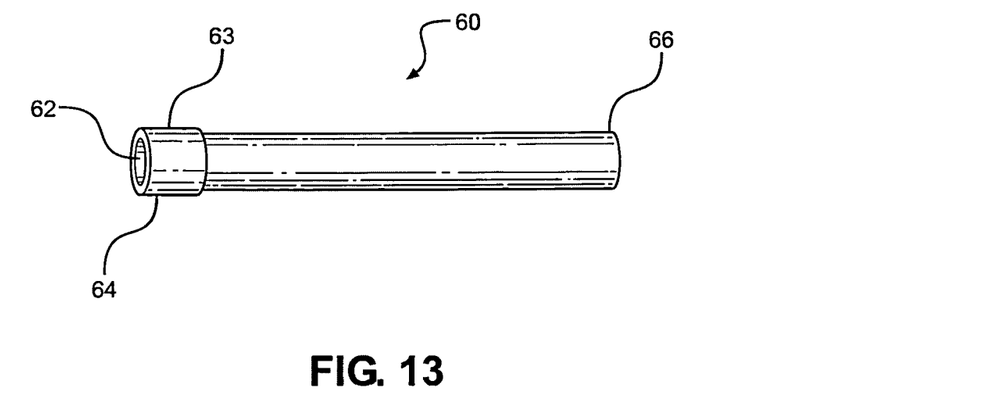
FIG. 13 is a perspective view of the insertion tube.
Figure 14:
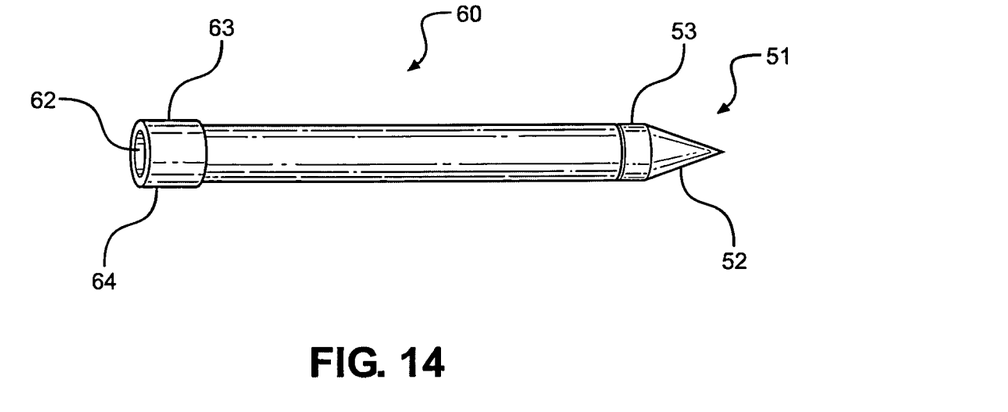
FIG. 14 is perspective view of the insertion tube with the repair plug inserted.

The repair plug itself is fitted within an insertion tube 60. The insertion tube 60 is comprised of an outer tube 61 and an inner tube 62. The outer tube 61, into which the repair plug is fitted is about one to two inches long, although the length of the tube may vary. The tube also has a collar 63 at the proximal end 64 of the outer tube 61 which allows the insertion tube 60 to be fitted within the nose piece. The proximal base rim 65 of the tip 51 is fitted against the distal rim 66 of the tube 61, with the tip collar 59 fitting within the outer tube 61, such that the repair plug does not fall out of the outer tube 61, but removably fits. The proximal base rim 65 of the tip may be the roughly the same circumference or slightly larger (by a matter of microns or fractions of millimeters or more) than the circumference of distal rim 66 of the tube 61. In one embodiment, there is an inner tube 62 positioned within the collar. The proximal end 67 of the inner tube 62 is flared.

A typical tire repair kit of the disclosure contains a polyethylene or silicone case, the tool, at least one temporary or permanent repair plug, five repair plugs, three insertion tubes, repair plugs already loaded into the insertion tubes (three), and a clearing tool accessory.

To get started, unscrew the cap to remove the stored tools for repair. Unscrew the nose piece, and slip the preloaded tube over the protruding pin. Slide the nose piece over the tube. Firmly finger tighten the nose piece clockwise. The tool is now ready to use. If the tube is not pre-loaded with a plug, roll the plug firmly between the pointer finger and the thumb to reduce the diameter and straighten as needed. It is helpful to wet the plug cord with water or saliva before rolling it to make it less sticky. Water acts as a lubricant for easier insertion in the tube.

Load the plug into the stainless steel tube until the brass tip seats against the end of the tube. Next, remove the puncture object with pliers and note the object's angle in the tire tread. At this point, either the temporary or permanent repair plug can be inserted into the hole, or the clearing tool accessory can be used and then the temporary or permanent repair plug can be inserted into the hole. Alternatively, one can skip one or both of these steps.

Insert the tool into the puncture path and push at the same angle straight through the puncture hole. Push hard until the tool body bottoms out on the tire tread. Usually, unless the tip is threaded, it is not advisable to twist or turn the tool when inserting the repair plug since this can damage the plug tip.

Next, pull the tool from the tire. The plug will remain in the puncture path and "fuse" with the rubber. The excess rubber sticking out from the tire can then be trimmed. Before trimming, inspect the plug carefully to make sure it is 100% sealed. If one has a small amount of water, put a few drops on the repair location; if no bubbles are seen, there would be no leaking. Then the plug tail can be trimmed and flushed with the tire.

If needed, multiple plugs can be sealed with the puncture after the first plug is installed. In this case, the tail is not cut off from the first plug; instead, the fold and hold the tail flat on the tire while the $2^{nd}$ plug is installed. This stops the $1^{st}$ plug from being pushed into tire. After the $2^{nd}$ plug is inserted, checks for air leaks need to be repeated. A $3^{rd}$ and $4^{th}$ plug may be installed in the same manner. With a good seal, the tail ends should be cut-off to the tire surface. If air is lost during the repair, the tire needs to be lasted to the specification recommended by manufacturer.

As needed, it a good idea to clean the insertion tube. If material from the repair plug is seen on the tube walls, the tube can be cleaned with denatured alcohol. To remove some rubber from the inside of the tube, a pipe cleaner can be used that has been dipped in denatured alcohol. It is easier to install the next repair plug if the tube is clean.

In another embodiment of the disclosure, the tool 100 comprising a top section 110 and a bottom section 120. The tool is similar to the first embodiment 1; however, the bottom section 120 is comprised of rubber or silicone, and fits into the top section 110 just as a rubber stopper would. The bottom section has a grip 111 wherein the distal end of the grip abuts the circumference 112 of the proximal end of the top section 110. In one embodiment of the disclosure, the circumference 113 of the distal rim of the bottom section 120 is larger than the circumference 114 of the proximal end of the top section 112.

Figure 15:
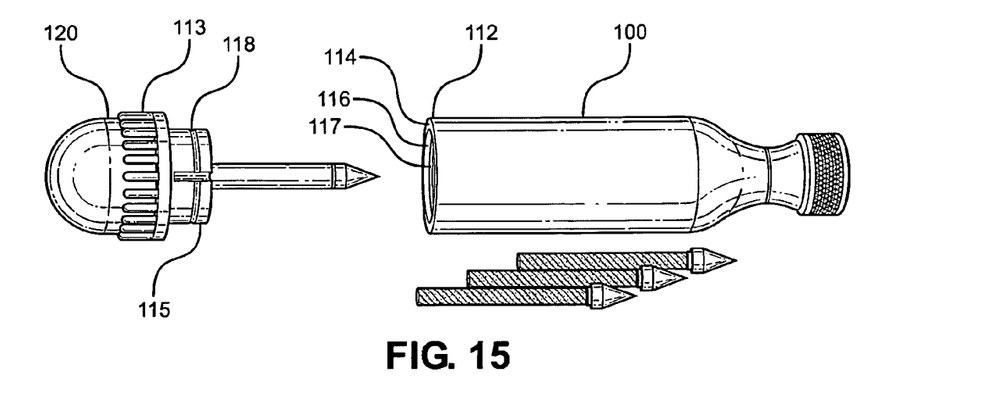
FIG. 15 is perspective view of the another embodiment of the tool.
Figure 16:
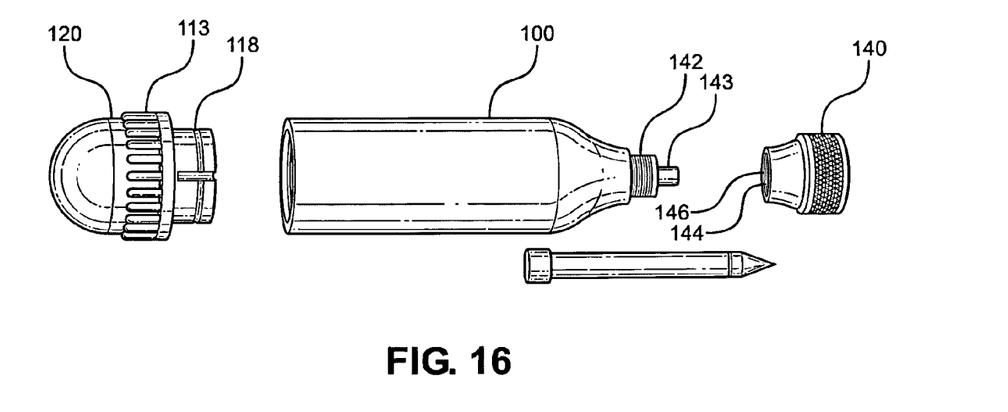
FIG. 16 is another perspective view of the embodiment of FIG. 15.
Figure 18:
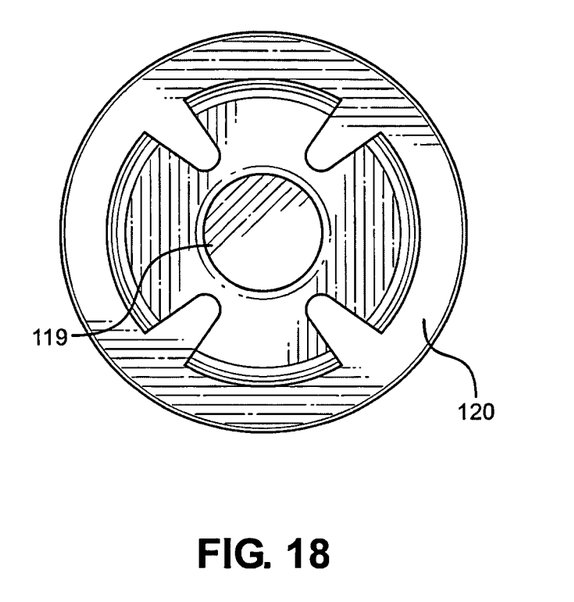
FIG. 18 is a frontal view of the bottom section of the embodiment of FIG. 15.
Figure 19:
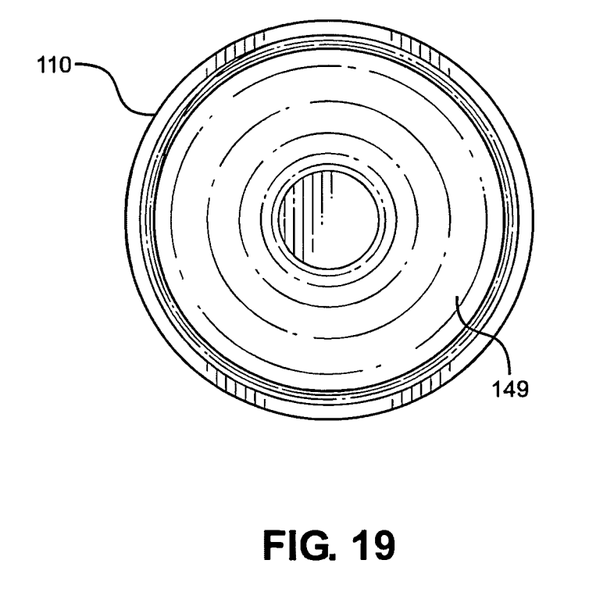
FIG. 19 is a front view of the top section of the embodiment of FIG. 15.

The bottom section 120 also has a plug 115 that fits within an opening 116 of the top section 110. The top section 110 is hollow 149. In one embodiment of the disclosure, metal rims 117 within the opening 116 of the top section 110 mate with the rims and/or indentations 118 of the circumference of the plug 115.

Additionally, the plug has a hole 119 centrally located, in which the proximal end of an insertion tube 60 can be loaded so as to repair a tire. The insertion tube 60, loaded or unloaded can fit in to the hole 119 such that the bottom section 120 can serve as a handle or plunger so as to allow for the insertion of the tube and the repair plug into the tire.

The tools of the kit, which may include a pipe cleaner 130, in addition to or as a supplement to the other tools, are contained in within the hollow body 131 of the tool.

Figure 17:
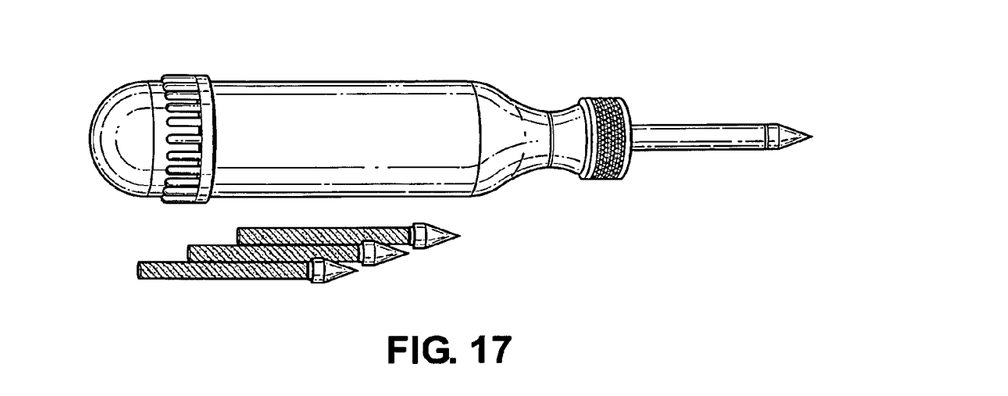
FIG. 17 is a perspective view of the one embodiment of the assembled tool.

The tool 100 also comprises a nose piece 140. At the distal end 141 of the tool 100 is a narrowed threaded section 142 with a centered projection pin 143. A nose piece 140 has a centered lateral opening 146 therein and complementary threads 144 around said opening 143 is fitted over said centered projection pin 143 and the narrowed threaded section 142. When an appropriate tool is inserted through the centered lateral opening 146, the nose piece 140 is screwed down over the narrowed threaded section 142. An inward rim 145 at the distal end 141 of the nose piece 140 locks down the inserted tool, identical to the nose piece described, supra.

Figure 20:
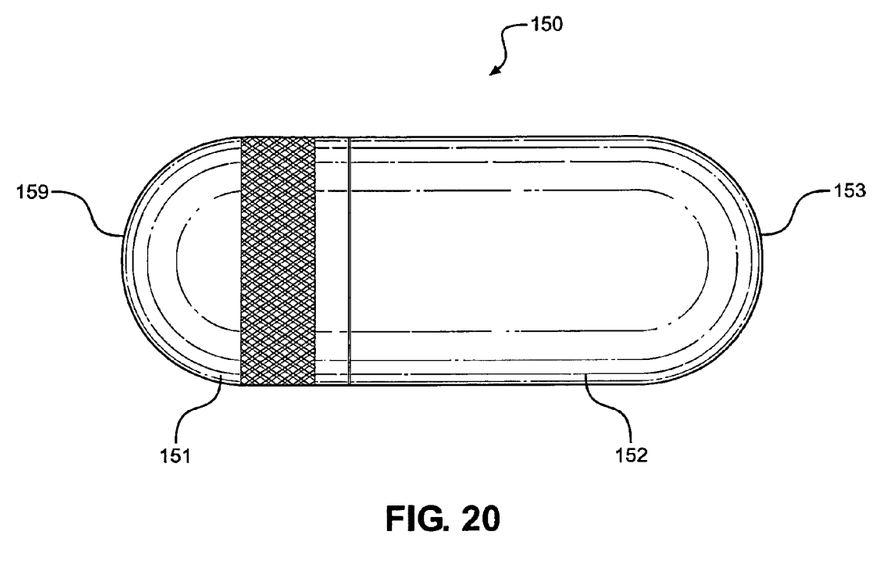
FIG. 20 is a frontal view of yet another embodiment.

Another embodiment of the disclosure is compact and can be readily be used for bicycle and motorcycle repairs. This device is about two to about three inches long (FIG. 20). This embodiment has a case 150 having a first section 151 and a second section 152 which screw together, with one section have the male threads, and the second section having the female threads. Other known methods can be used for securing the two sections tighter. The first section 151, which can also be referred to as the cap, has a rounded end 159. In one embodiment, the second section also has a rounded end 153.

Figure 21:
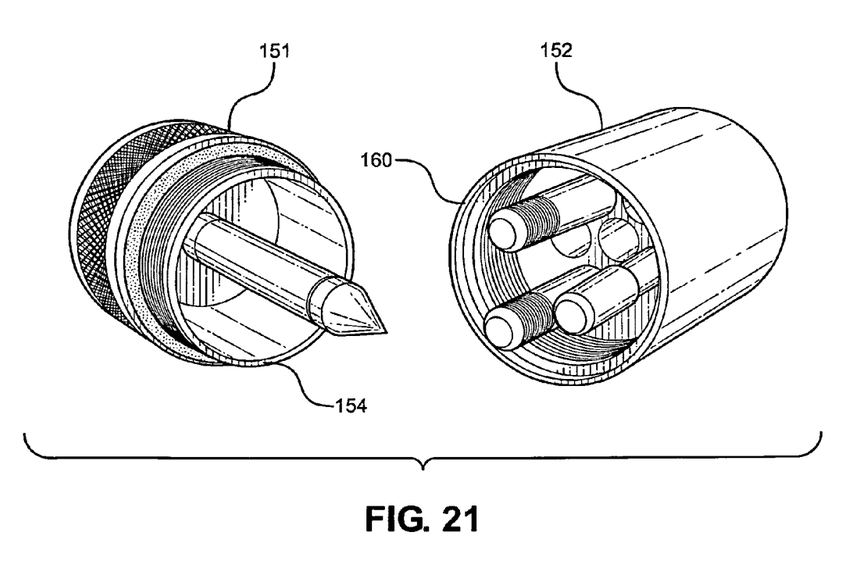
FIG. 21 is a perspective of the inside of the top section and bottom section of the embodiment of FIG. 20.

Inside of the first section is a centered threaded hole 154. The proximal ends 155 of insertion tube 156 and the proximal end 157 of clearance tool 158 do not have shoulders or collars as in the other embodiments, but are instead threaded 190 at their proximal ends that so as to be screwed into hole 154. The cap 151 is used to push either the clearance tool 158 or the tire plug into the hole in the tire.

Figure 22:
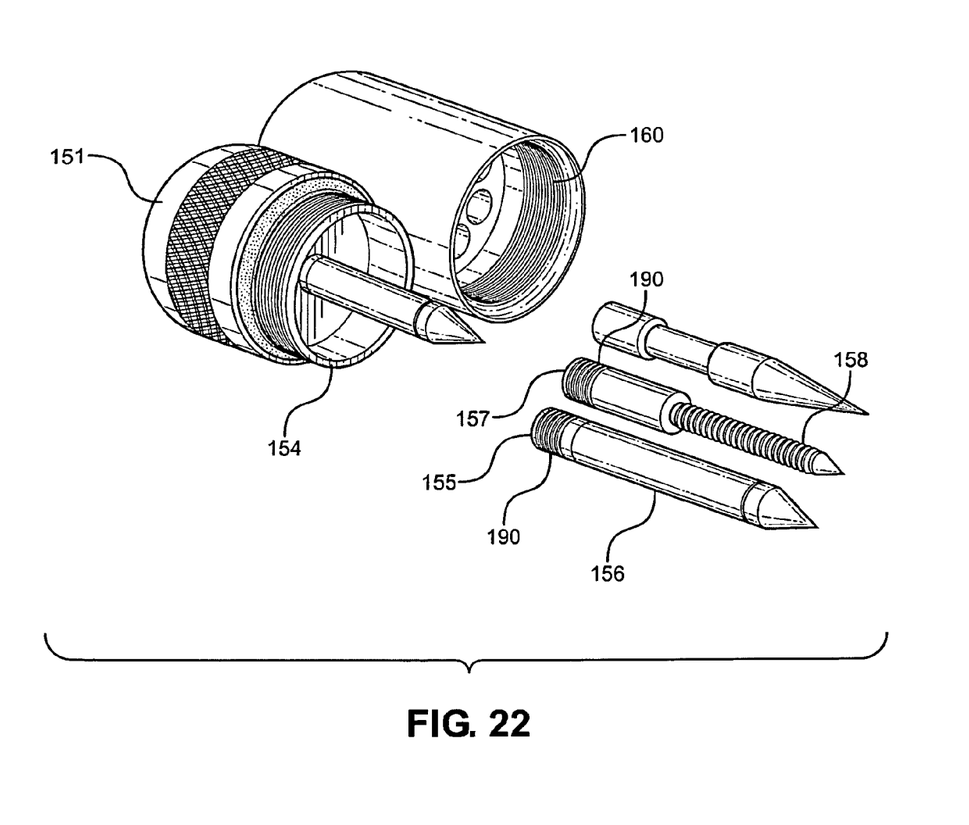
FIG. 22 is another perspective showing the device of FIG. 20.

Inside the second section 152 is a hollow space, wherein there are a plurality of pockets 160 through which various tools fit. There are normally from about four to about six pockets. In another embodiment (not shown), the second section is hollow and therein fits a support platform having openings through which the various puncture repair tools fit.

This tool is only about two to three inches long, and is easily carried on a motorcycle or bicycle backpack. In one embodiment, the tools are all shorter and generally range no more than from about one inch to one and one and three quarters inches, or two inches at most. The basic use of the tools is similar as in other models, except that the tools are screwed into the first section 151 as described above, and the user pushes on the base of the first section 151 (the cap to push the tool into the hole being repaired.

Figure 23:
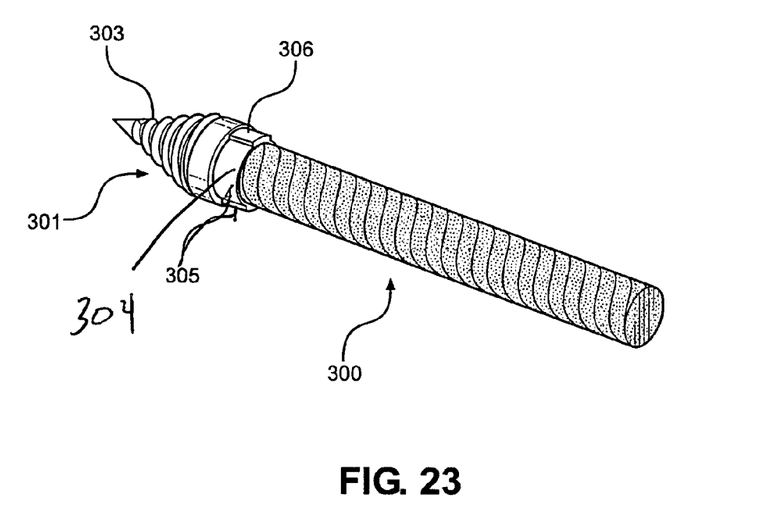
FIG. 23 is a perspective view of another embodiment of the tire repair plug.
Figure 24:
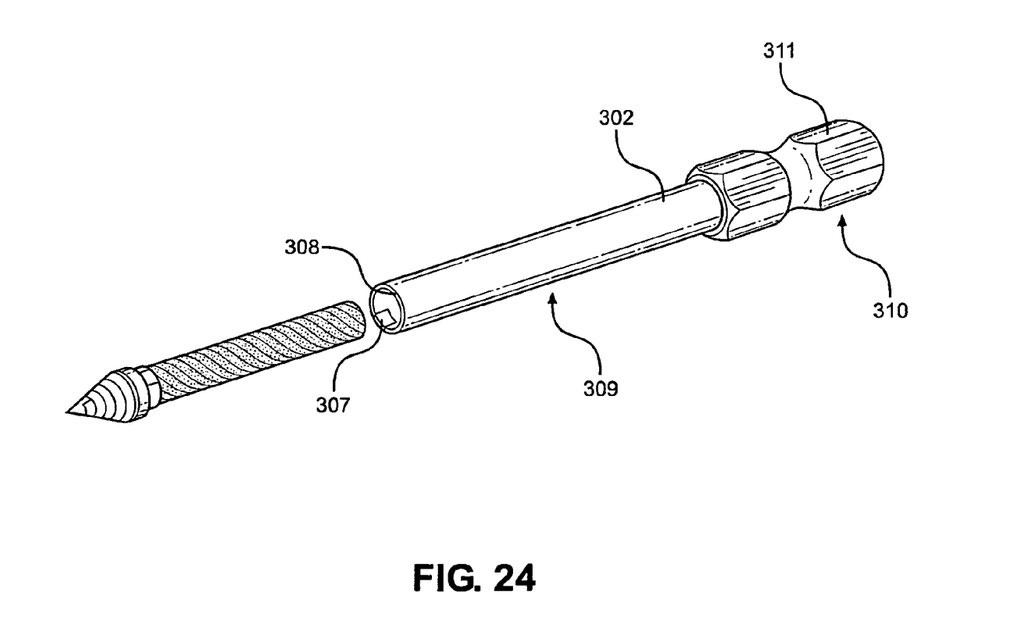
FIG. 24 is a perspective view of the insert tube for the embodiment of FIG. 23.

Another embodiment allows for the use of the tire repair plugs 300 in heavier or larger tires. And also employs mechanical advantage so that physically impaired or individuals with less physical strength like children and the elderly, can successfully make tire repairs both on standard and heavy duty, larger tires. In this embodiment, the 301 tip of the repair plug 300 is spirally threaded 303. On the collar 304 of the repair plug 300 is at least one and possibly or more two keys 305, 306, "projections" from the collar 304. Complementary indentations 307, 308 are found in the inside of the distal end of the tube 309. "The "keying" of the threaded tip (attached to the repair plug) to the insertion tube is done on the inside of the tube so that there is minimal friction on the insertion tube as it rotates with no protrusions to catch on steel belting or other obstacles in the puncture path. In one embodiment, the spiral threaded tip is a typical embodiment of a clockwise thread that is turned clockwise to insert. In another embodiment, the spiral threaded tip has a counter clockwise thread that is turned counter clockwise to insert.

Figure 25:
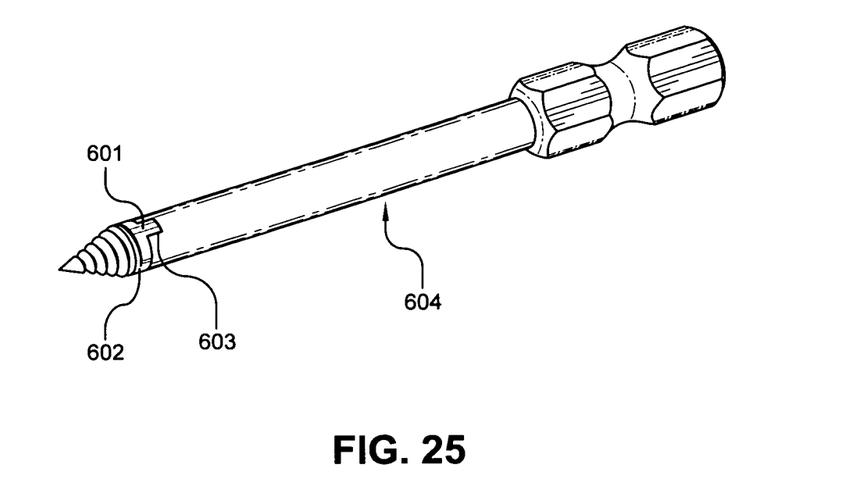
FIG. 25 is a front view of an alternative embodiment of the connection between the hollow tube and the conical tip.

In another embodiment, the key 601 or keys extend from the shoulder 602 of the conical threaded tip 600. These keys then fit into complementary cutaway or indentations 603 in the tube 604. The cutaway or indentations 603 extend through the walls of the tube 604. It should be noted that either of the key extensions can be used in any of the other embodiments of the disclosure.

Figure 26:
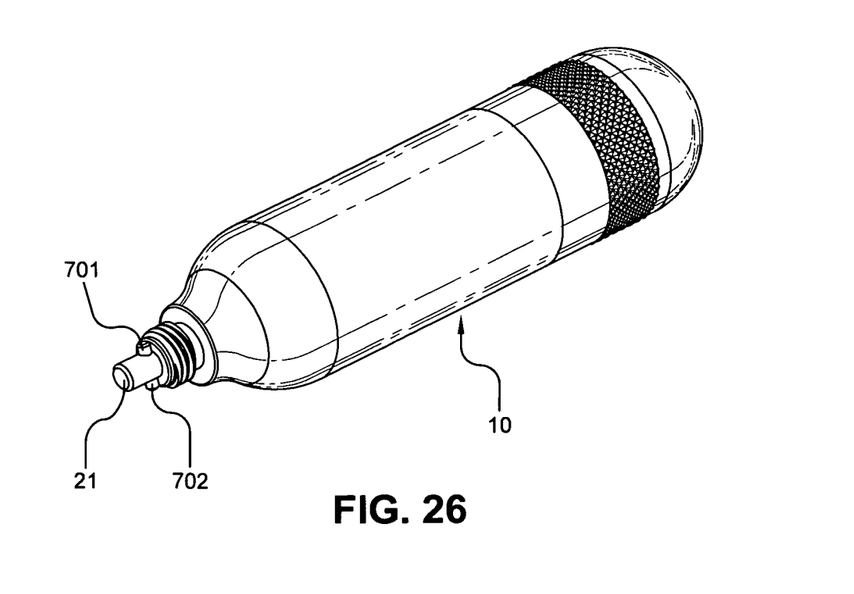
FIG. 26 is a front view of an alternative embodiment of FIG. 4.
Figure 27:
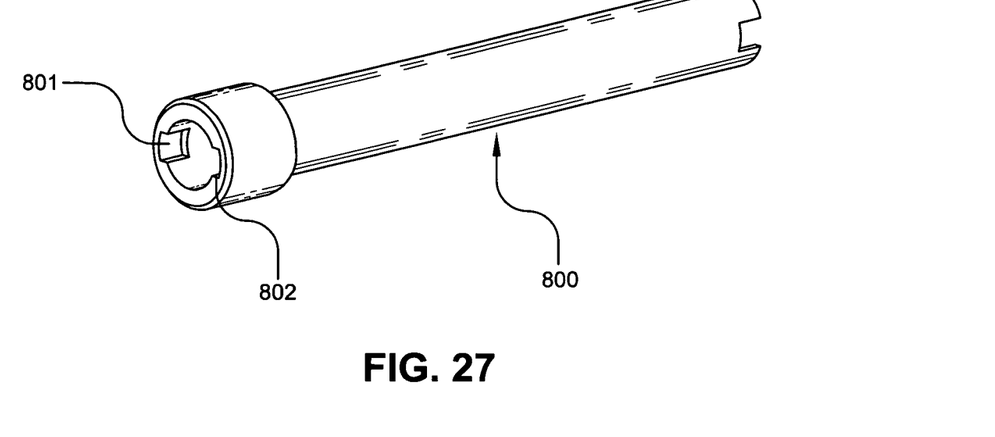
FIG. 27 is a perspective view of the hollow tube with interior notches.
Figure 28:
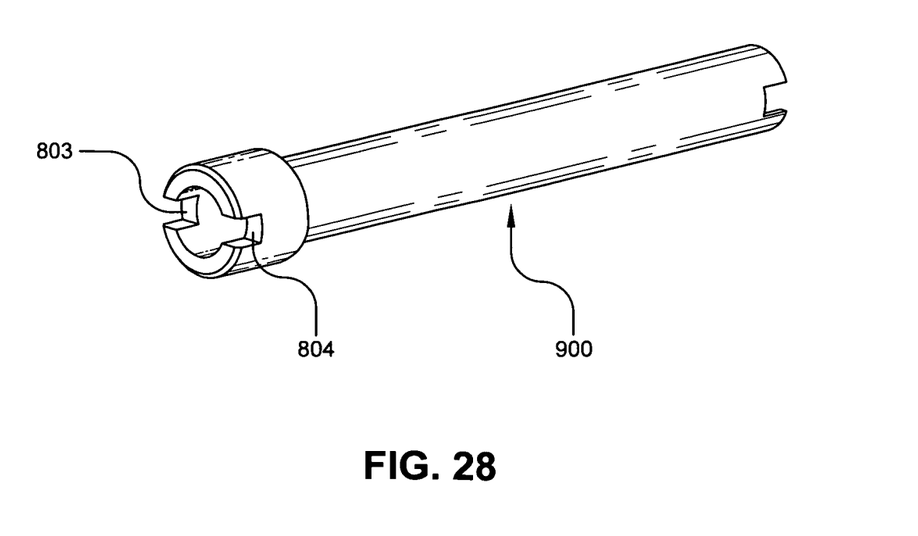
FIG. 28 is a perspective view of an alternative embodiment of FIG. 27.

In another embodiment, the spiral tip 301 of the repair plug is used with the other embodiments of the tools. If tool 10 is used for plugging holes in larger or thicker tires, or to repair standard tires if an individual is not physically able to insert the embodiment of a push-in and pull-out plug with a smooth tip, the spiral tip is used, and in another embodiment the spiral tip 301 used has either a key 305, 306 extending from either the collar (305, 306) or a key 601 extending from the shoulder of the spiral tip. Additionally, in another embodiment (FIG. 26), pin 21 of tool 10 comprises at least one key in one embodiment and two or more keys 701, 702 in other embodiments. At the proximal end of the insertion tube 800 are two notches 801, 802 into which keys 701, 702 fit. The notches can be within the walls of the insertion tube 800 or notches 803, 804 can be through the outer walls of insertion tube 900.

The repair kit does not have to be used merely as a hand tool in and of itself, but can be attached to hand and power drills to expedite the repair process and make it easier to repair punctures on larger tires.

In one embodiment the proximal end 302 of the tube 309 is attached to a bit structure 310, similar to that found on a normal drill bit. In the figures, a hexagonal bit end 311 is used. Attachment of the tube to the bit is by any known means. The bit end is configured for ratchet or no ratchet driving hand or power tools (usually by means of a hex socket, quick connect chuck or conventional drill chuck or hex chuck) to give more mechanical advantage to drive the tip via the puncture path through the tire. This ratcheting or power driving device like an "impact/drill driver" and so that the user requires minimal force and strength to penetrate a tire whether standard or industrial duty. Once through the tire the tool is extracted leaving the repair plug and tail inserted in the tire to make the repair like the non-threaded tip designs. This kit can contain hand driven drill or a battery operated power drill with a removably covered space allowing for the storage of the components of the repair kit. A regular power drill can be used and even carried on trucks to assist in the repair of heavy duty truck tires of the sort normally found on tractor trailers. In one embodiment the bit is hexagonal; however, other bit shapes can be used. In an alternative embodiment of the disclosure, a custom end cap is added to the hand tool shown in FIG. 26 to provide a ratcheting capability. In one embodiment, the custom end cap is affixed to the nose piece of the tool. In another embodiment the custom end cap is attached to the end cap, and allows for the attachment to the existing threads machined in the tools.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

What is claimed is:

1. 1) A tire repair kit comprising:
   a) at least one repair plug, said repair plug comprising:
   1) a spirally threaded pointed conical metal tip, said spirally threaded pointed conical tip further comprising:
      A) a circumferential shoulder proximal and integral to said pointed conical metal tip; and
      B) a tip collar positioned proximally and integral to the circumferential shoulder; and
   2) an elongated rubberized impregnated plug, said rubberized impregnated cord or a tail or other flexible or semi-rigid composites, attached to inside of a proximal end of the conical metal tip; and
   b) at least one hollow insertion tube, said hollow tube comprising:
   1) a distal end into which said repair plug fits by means of inserting the rubberized impregnated plug, wherein the tip collar fits in the insertion tube, and such that a circumference of the distal end of the hollow tube is no greater than the circumferential rim of the pointed conical metal tip; and
   2) a proximal end, said proximal end comprising bit structure at the proximal end of the outer tube which allows the insertion tube to be fitted into a chuck or directly into a drill.

2. The tire repair kit of claim 1, wherein said conical metal tip of said repair plug is strong enough to pierce through the steel belt of a steel belted radial tire, or multi-belted synthetic ply tires, and said conical tip is made out of a material selected from the group consisting of bronze, copper, stainless steel, carbon fiber, and synthetic plastics.

3. The tire repair kit of claim 1, wherein said bit is a hexagonal bit.

4. The tire repair kit of claim 1, wherein said proximal end of said at least one hollow tube further comprises a flared inner tube inside the collar.

5. The tire repair kit of claim 1, further comprising a temporary or permanent repair plug.

6. The tire repair kit of claim 5, wherein said temporary or permanent repair plug further comprises an elongated conical structure, said conical structure being pointed at said distal end.

7. The tire repair kit of claim 5, wherein said temporary or permanent repair plug further comprises a gripping section proximal to said elongated conical structure.

8. The tire repair kit of claim 1, further comprising a hand drill.

9. The tire repair kit of claim 8, further comprising a removably covered compartment in said hand drill for storing tools of the tire repair kit.

10. The tire repair kit of claim 1, further comprising a power drill.

11. The tire repair kit of claim 10, further comprising a removably covered compartment in said power drill for storing tools of the tire repair kit.

12. The tire repair kit of claim 1, wherein said tip collar of said repair plug further comprises at least one projection key and inside of said distal end of said hollow insertion tube comprises a complementary indentation matching each said at least one projection key.

13. The tire repair kit of claim 1, wherein said shoulder of said repair plug further comprises at least one projection key and said distal end of said hollow insertion tube comprises a complementary indentation matching each said at least one projection key.

14. A tire repair kit comprising:
a) an elongated handle tool, said handle tool comprising:
1) a top section, the top section being the handle grip, said top section comprising;
A) a proximal end, said proximal end comprising:
i) an opening at the proximal end;
ii) a hollow section; and
iii) a plurality of pockets within said hollow section into which tools fit;
B) a distal end, said distal end comprising:
i) a narrowed threaded projection positioned at the outside distal end;
ii) a centered projection pin positioned at the center of the distal end of the narrow threaded section, said projection pin having at least one key;
iii) nose piece comprising:
a1) a ring having centered lateral opening;
a2) complementary threads around said centered lateral opening; and
a3) an inward rim at the distal end of the nose piece; such that when an appropriate tool is inserted through the centered lateral opening, the nose piece is screwed down over the narrowed threaded projection;
2) a bottom section, said bottom section comprising a bottom cap, wherein the bottom cap is tooled such that within the cap there is a centered seat wherein the proximal end of a tool fits;
b) at least one repair plug, said repair plug comprising:
3) a pointed conical metal tip ending having at its proximal end a circumferential shoulder and a tip collar positioned proximally to the circumferential shoulder; and
4) a rubberized impregnated plug, said rubberized impregnated cord attached to an inside of a proximal end of the conical tip; and
e) at least one hollow insertion tube, said hollow tube comprising:
5) a distal end into which said repair plug fits by means of inserting the rubberized impregnated plug, wherein the tip collar fits snugly in the insertion tube, and such that a circumference of the distal end of the hollow tube is no greater than the circumferential rim of the pointed conical metal tip; and
6) a proximal end, said proximal end comprising:
A) collar at the proximal end of the outer tube which allows the insertion tube to be fitted within the nose piece, said collar comprising a notch for each of said at least one key of said pin.

15. The tire repair kit of claim 14, wherein said proximal end of said at least one hollow tube further comprises a flared inner tube inside the collar.

16. The tire repair kit of claim 14, further comprising a clearing tool accessory, said clearing tool accessory being an elongated tool, said tool comprising:
a) a distal section, said distal end of the clearing tool accessory comprising:
i) small conical tip;
ii) a tubular structure, said small conical tip being integrally positioned at the distal end of said tubular structure;
ii) flutes designed to remove debris, and bend steel belt filaments away from a repair puncture path, said flutes beginning from a proximal end of said small conical tip on said tubular structure, said flutes perpendicular to the length of the clearing tool;
b) a proximal end, said proximal end comprising:
i) a metal jacket for supporting said tubular structure; and
ii) shoulder at the proximal end of the outer tube which allows the insertion tube to be fitted within the nose piece, said flutes ending at the distal end of the collar.

17. The tire repair kit of claim 14, further comprising a temporary or permanent repair plug.

18. The tire repair kit of claim 17, said temporary or permanent repair plug comprising an elongated conical structure, said conical structure being pointed at said distal end.

19. The tire repair kit of claim 1, wherein said pointed conical tip further comprises spirally threaded pointed conical metal tip.

* * * * *